United States Patent [19]

Moorer

[11] 4,189,164
[45] Feb. 19, 1980

[54] CONVERTIBLE BABY VEHICLE

[76] Inventor: Donald K. Moorer, 3547 Jonathan Cir., Augusta, Ga. 30906

[21] Appl. No.: 840,051

[22] Filed: Oct. 6, 1977

[51] Int. Cl.² .............................................. B62B 7/12
[52] U.S. Cl. .................................... 280/87.05; 297/5; D12/128; D12/130
[58] Field of Search ................ 280/87.02 R, 87.02 W, 280/31, 87.05; D12/130, 129; 297/5, 6

[56] References Cited

U.S. PATENT DOCUMENTS

| | | | |
|---|---|---|---|
| 2,754,889 | 7/1956 | Lovelace | 280/31 |
| 3,111,332 | 11/1963 | Birch | 280/31 |
| 3,463,504 | 8/1969 | Petry et al. | 280/31 |
| 3,659,865 | 5/1972 | Nothacker | 280/31 X |
| 3,992,032 | 11/1976 | Moorer | 280/87.02 R |

Primary Examiner—John A. Pekar

[57] ABSTRACT

A convertible vehicle for babies consisting of a frame supported upon caster wheels, interchangeable platforms are attached to the frame using compression coil springs, removably secured and interchangeable stroller handle and handlebar attachments connect to upwardly turned ends of front frame sections, side frame sections support stop mount and extension arm attachments.

3 Claims, 21 Drawing Figures

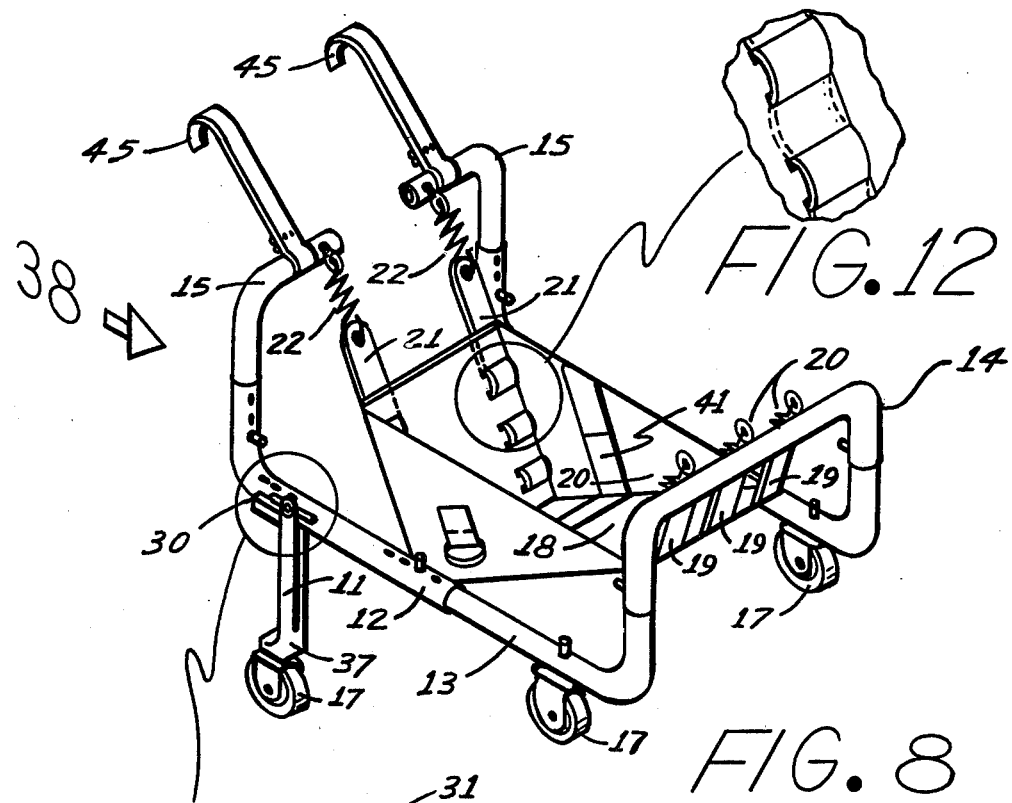
FIG. 12
FIG. 8
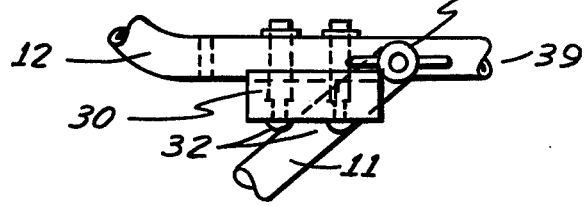
FIG. 9
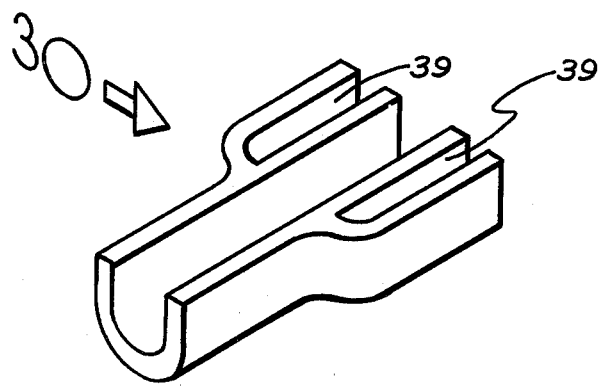
FIG. 10
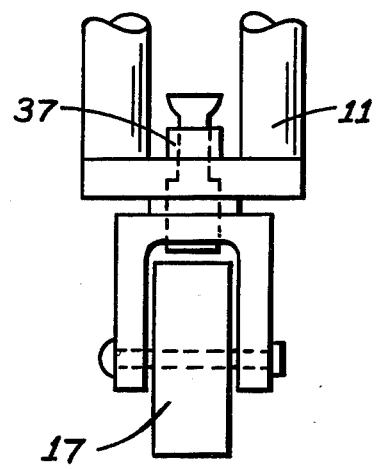
FIG. 11

CONVERTIBLE BABY VEHICLE

SUMMARY OF THE INVENTION

This invention relates generally to multi-purpose (crawler, walker, stroller, bassinet etc) devices. More specifically the present invention relates to multi-purpose devices designed particularly for babies.

A principal object of the present invention is to provide a multi-purpose device which includes rollable wheels so to assist the baby in moving from place to place and to move the baby from place to place.

Another object of the present invention is to provide a multi-purpose device having the advantage of supporting the child's weight, thus making it easier for the infant to push himself about with less effort (i.e., crawler, walker).

Still another object of the present invention is to provide a multi-purpose device having the advantage of supporting the child's weight and thus making it easier to move the infant from place to place (i.e., stroller, bassinet).

A further object of the present invention is to provide an adjustable platform for the multi-purpose device which can be changed to a baby's storage bag (i.e., by fastening all four sides of the platform to form a bag) for clean diapers, clothes, or other small items.

Still a further object of the present invention is to provide a multi-purpose device which in one form of the invention is readily adjustable in length and elevation so as to suit babies of varying size and age.

Also an object of the present invention is to provide a multi-purpose device which aids in developing the muscles of the baby's arms and legs because the device permits these appendages to be used while the child is resting upon his stomach or standing upon his feet (i.e., crawler, walker).

Other objects are to provide a multi-purpose device which is simple in design, inexpensive to manufacture, rugged in construction, easy to use and efficient an operation.

These and other objects will be readily evident upon a study of the following specification and the accompanying drawings, wherein:

BRIEF DESCRIPTION OF THE DRAWINGS

FIG. 8 is a perspective view of the stroller.

FIGS. 9 and 10 are enlarged detailed and perspective views of the stroller stop-mount.

FIG. 11 is a perspective view of a portion of the end of the extension arm.

FIG. 12 is a perspective view of a portion of the back of the stroller seat.

BABY CRAWLER

Figure 1:
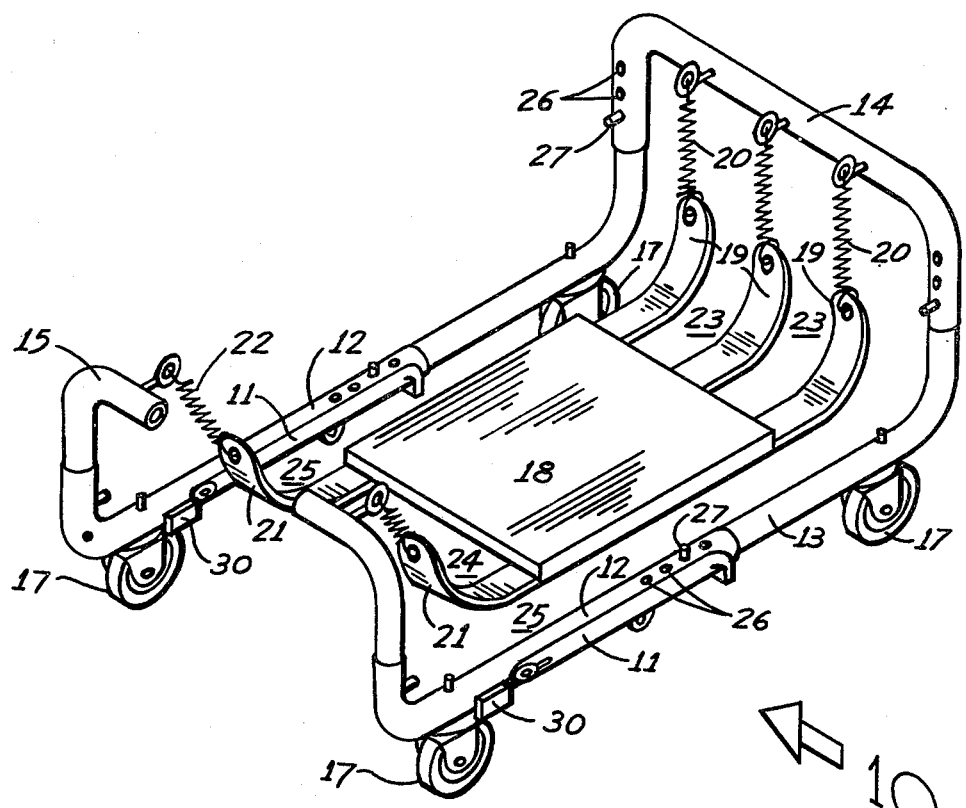
FIG. 1 is a perspective view showing one design of the present invention.
Figure 2:
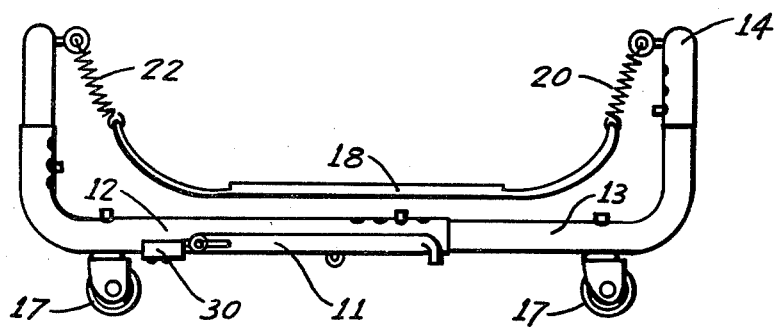
FIG. 2 is a side elevation view thereof.
Figure 3:
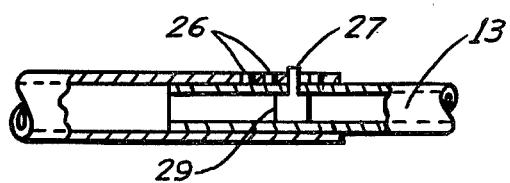
FIG. 3 is an enlarged detailed cross sectional view of one of the adjustable latching assemblies.
Figure 4:
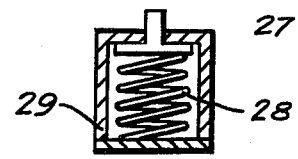
FIG. 4 is an enlarged cross sectional view through the adjustable latch.

Referring now to the drawing in detail, and more particularly to FIGS. 1 through 4 thereof at this time, the reference numeral 10 represents a baby crawler according to the present invention wherein there is a frame 12 comprised of aluminum tubing sections that are interfitted together as shown at 12, 13, 14 and 15, the frame being supported upon a plurality of four casters 16 having caster wheels 17 adaptable to travel in any direction. The caster wheels are preferably made of a hard plastic material so to be able to travel across floors of a home without marring the same.

The frame 15 supports a seating 18 made of a polyurethane plastic material, the seating at one end being formed having three extending tabs 19 each of which are supported by means of compression coil springs 20 to the frame tubing section 14. The opposite end of the seating 18 is integral with a pair of extending tabs 21 each of which are connected to compression coil spring 22 supported upon upwardly turned ends of frame sections 15. It is to be noted accordingly that the tabs 19 thus formed create spaces 23 therebetween and within which the child's legs may be fitted when he is resting with his stomach upon the upper surface of the seating 18. Likewise at the opposite end a space 24 is formed between the tabs 21 and space 25 is formed adjacent the outer sides thereof all of which permits a child for his hands to reach a floor while propelling himself about.

As shown, the frame sections 12, 13, 14 and 15 are adjustable so that the frame can be extended or contracted. This accomplished by means of a plurality of spaced apart openings 26 on certain of these members being selectively engagable with a button or pin 27 carried by an adjacent frame member. The button 27 is depressable downwardly against a compression coil spring 28 contained within a cylindrical housing 29 and which is fitted within the interior of the aluminum tubing of section 13. It will be noted that such adjustment between frame sections 12 and 13 allow the frame to be longitudinally expanded whereas such adjustment between frame sections 13 and 14 or 12 and 15 allow vertical adjustment of the end of the frame.

WALKER

Figure 5:
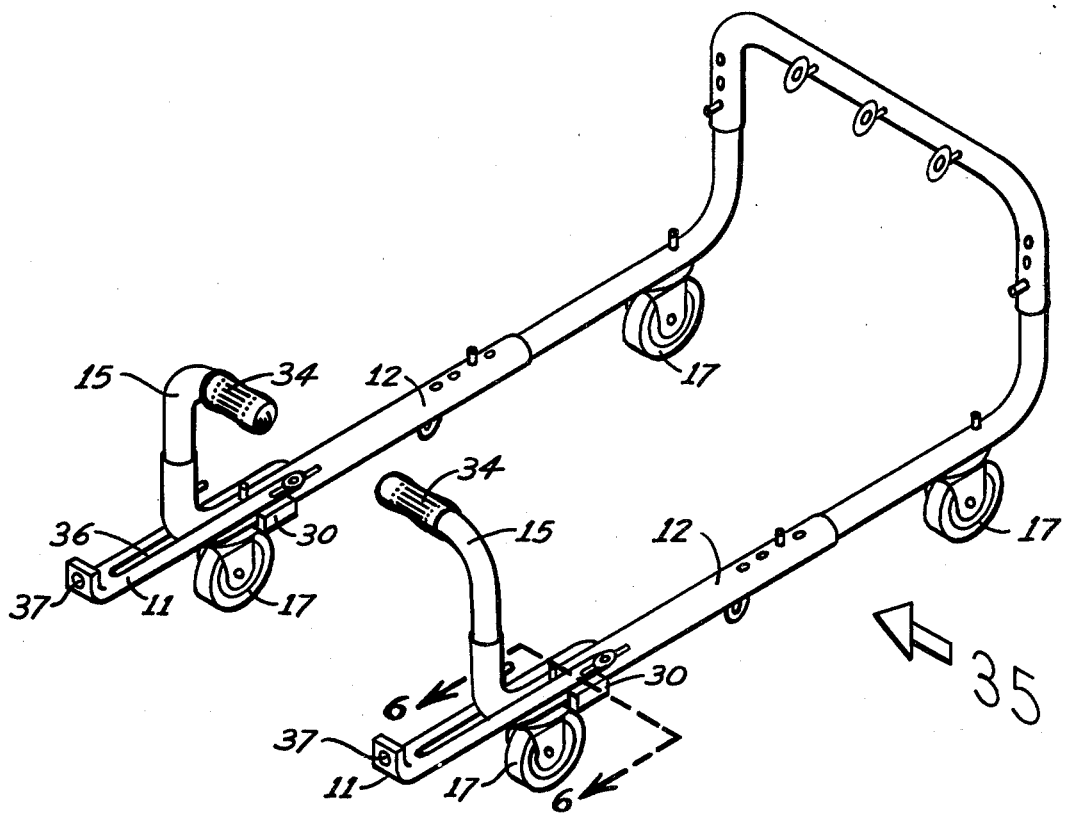
FIG. 5 is a perspective view of the walker.
Figure 7:
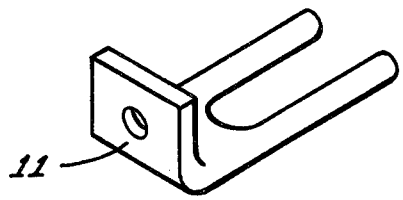
FIG. 7 is an enlarged view of a portion of the extension arm.
Figure 6:
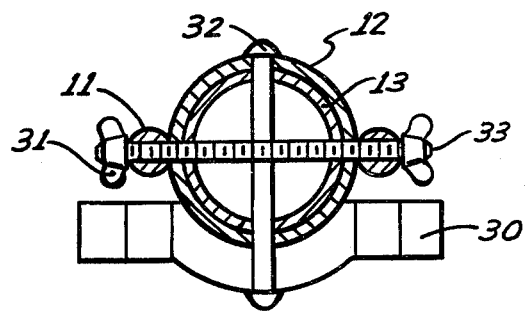
FIG. 6 is an enlarged detailed cross sectional view taken on line 6—6 of FIG. 5.
Figure 13:
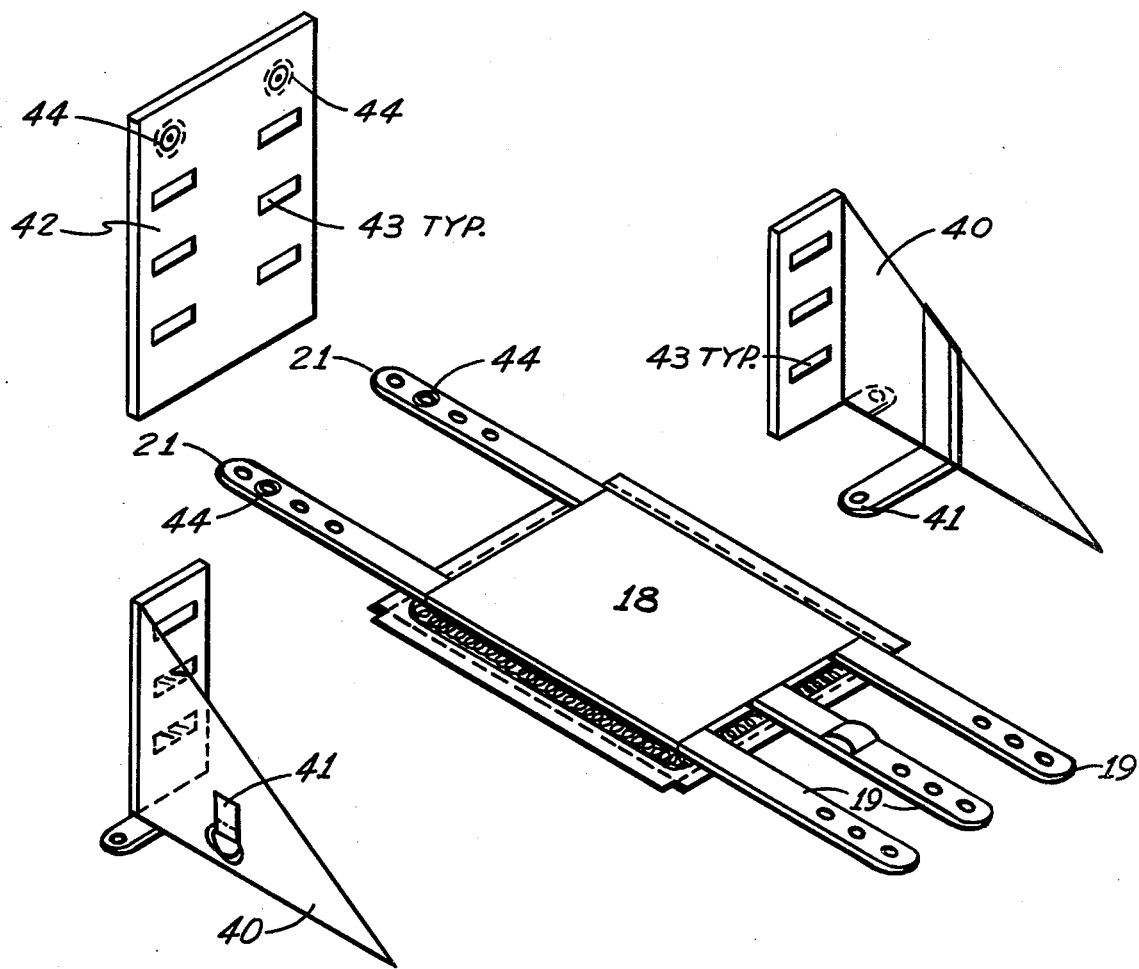
FIG. 13 is a detailed view of the stroller seat.
Figures 14, 15:
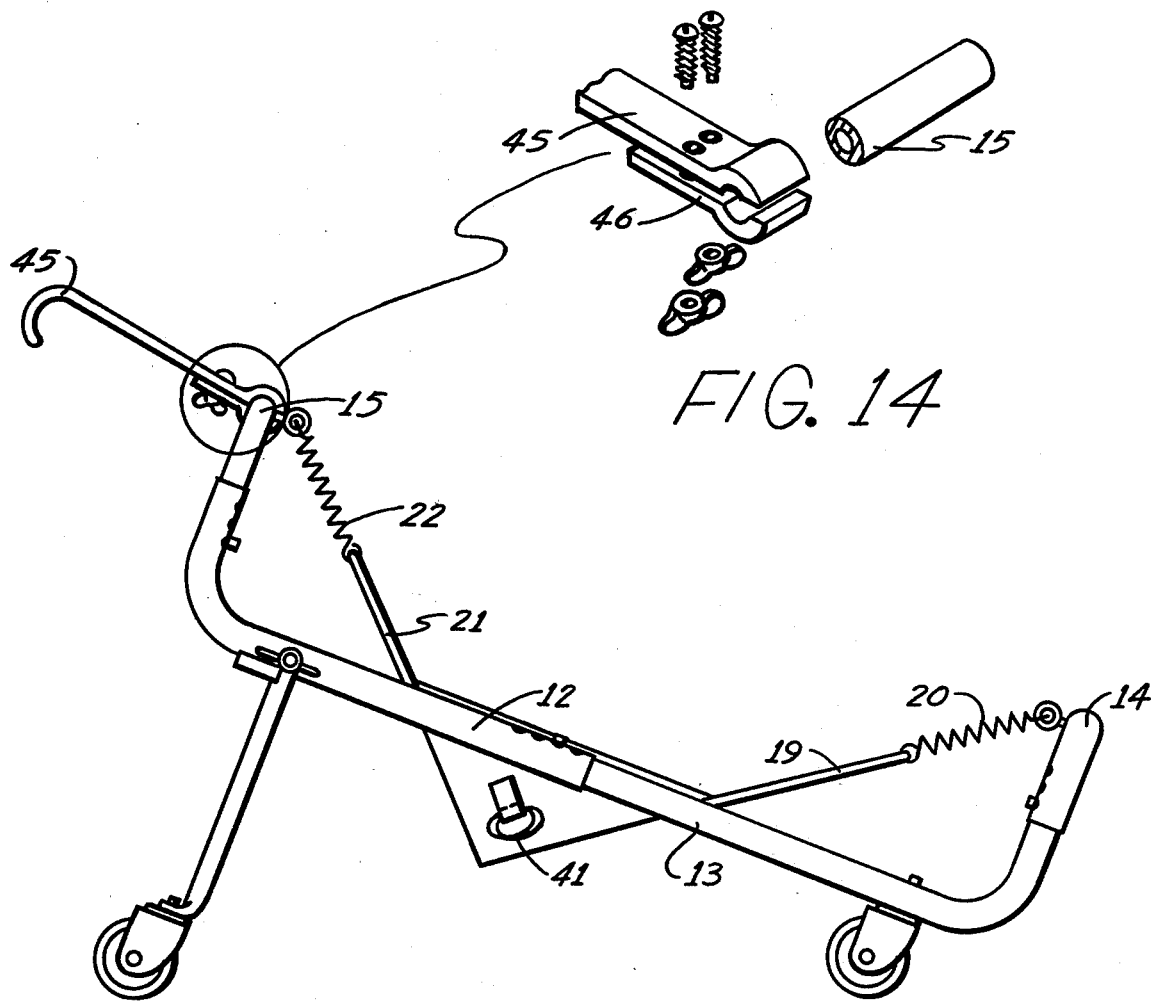
FIG. 14 is a perspective view of the stroller handle.
FIG. 15 is a side view thereof.
Figure 16:
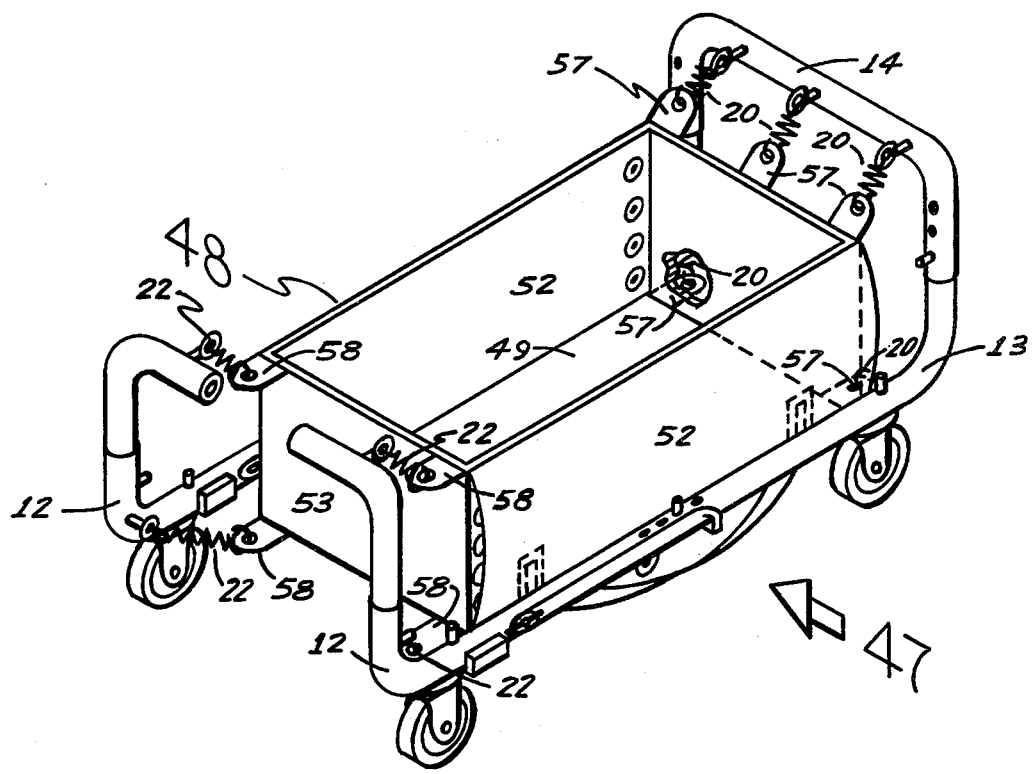
FIG. 16 is a perspective view of the bassinet.
Figure 17:
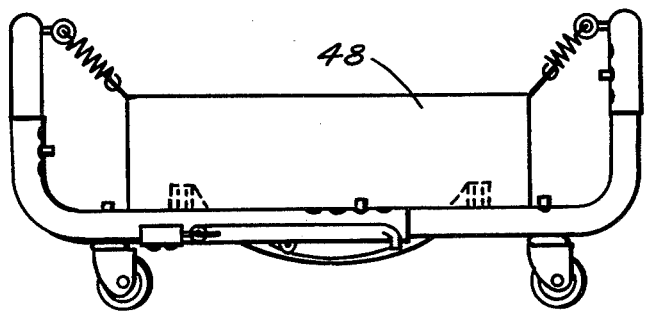
FIG. 17 is a side elevation view thereof.
Figure 18:
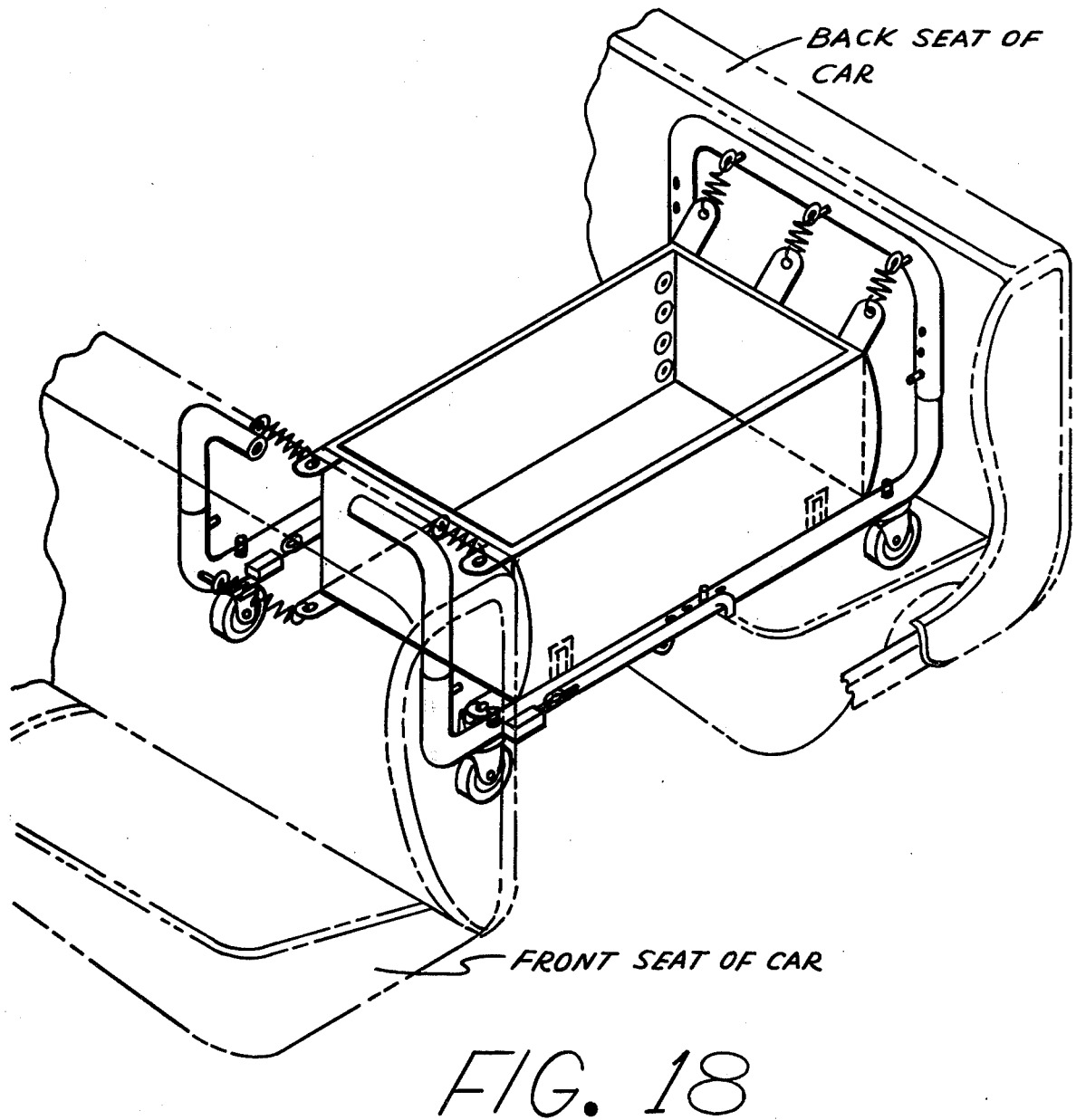
FIG. 18 is a perspective view of the bassinet in an automobile.
Figure 19:
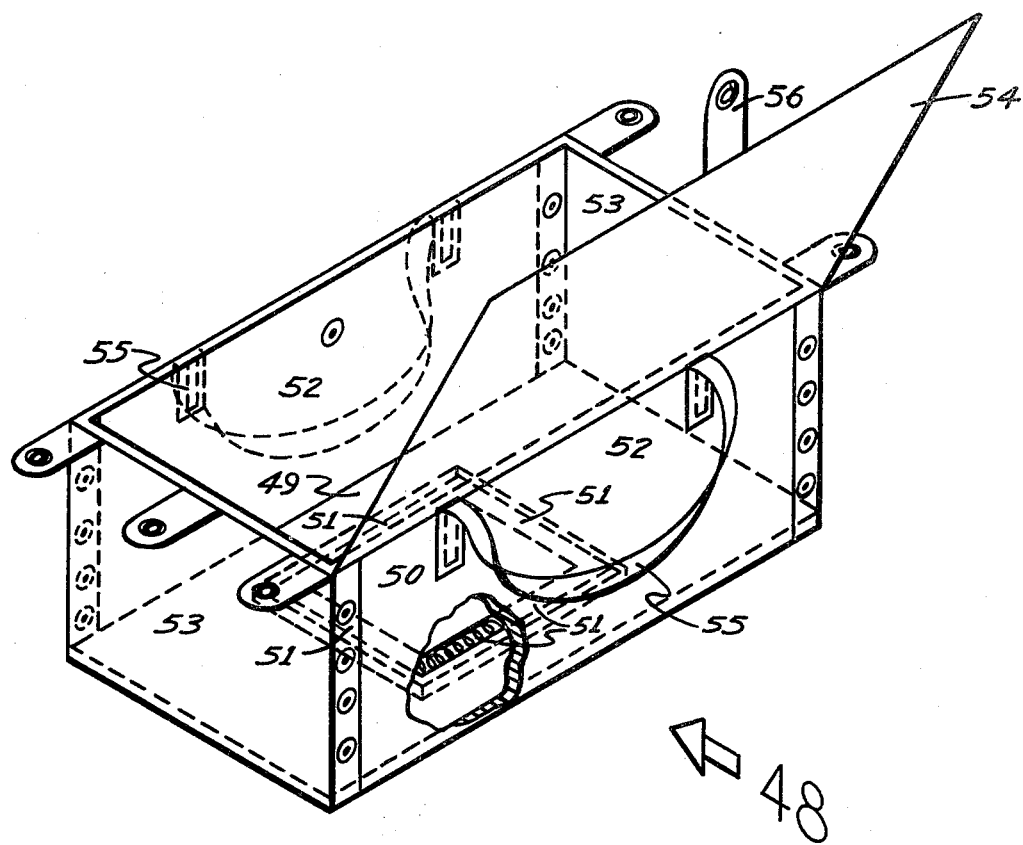
FIG. 19 is a perspective view of the bedding and storage bag.
Figure 19:
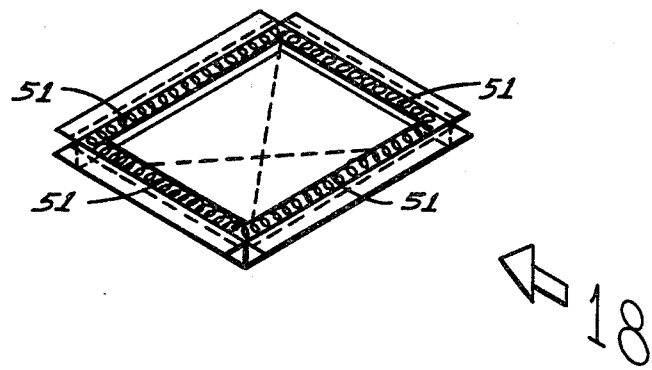
Figure 20:
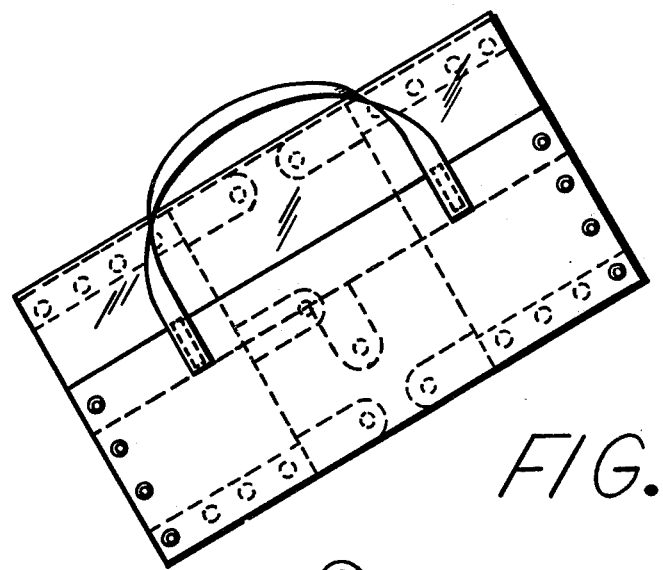
FIG. 20 is a perspective view of the bedding and storage bag when it is folded.
Figure 21:
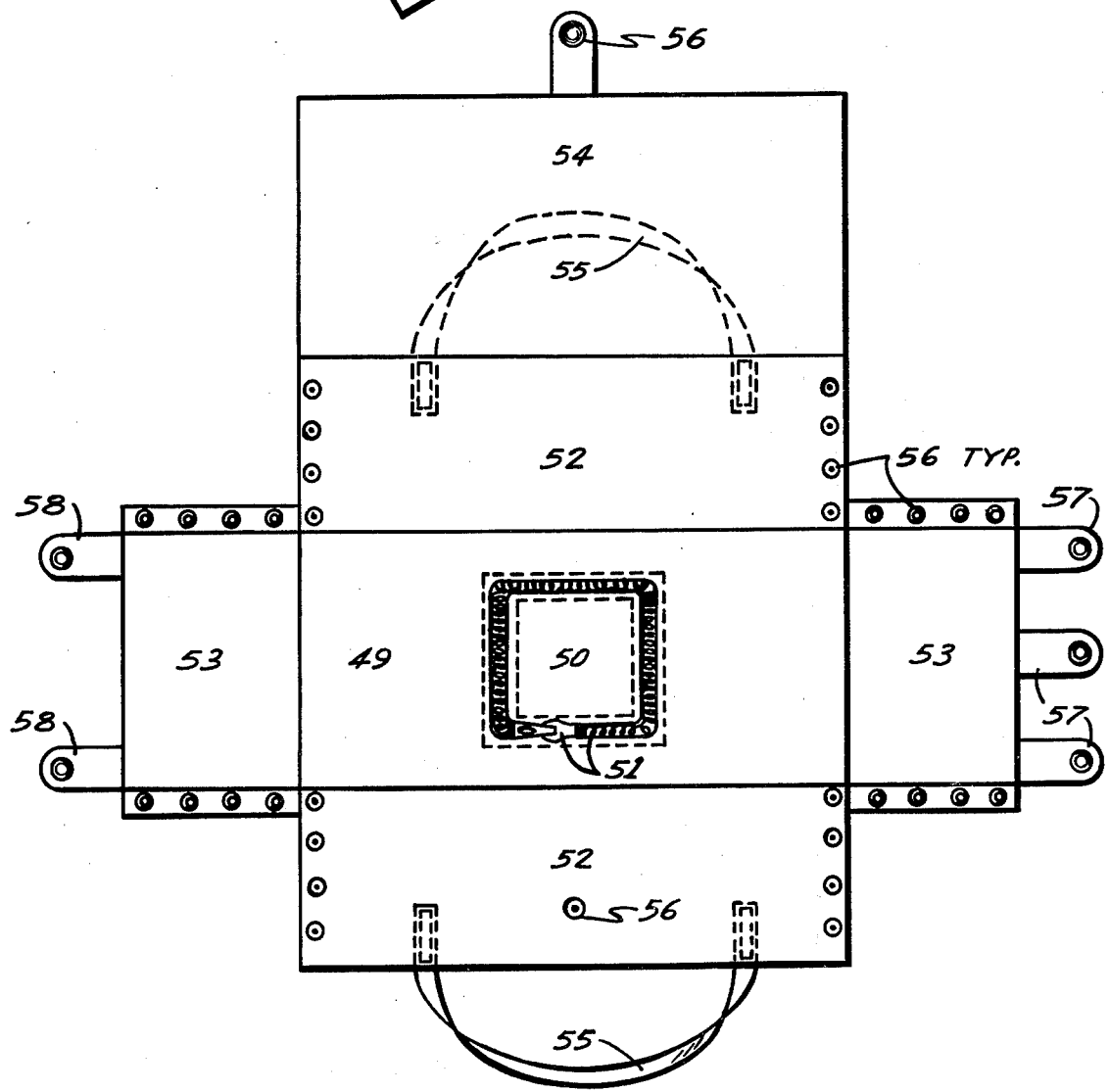
FIG. 21 is a detailed view of the bedding when it is unfolded.

Referring now to the drawings in detail, and more particularly to FIGS. 5 through 7 thereof at this time, the reference numeral 35 represents a walker according to the present invention wherein there is a frame which is the same as that described previously. The seating and springs are removed from the frame when the device is changed to a walker.

The frame 12 supports an extension arm 11 made of aluminum or hard plastic, the arm is connected by means of a screw 33 and two king nuts 31 which allows the arm 11 to pivot pass the caster wheel 17 and to be extended outwardly resting upon the floor or ground surface. It is to be noted accordingly that the arm 11 has sufficient space 36 between the nuts 31 to allow it to pivot past the caster wheel 17 and frame section 12 when the king nuts are slightly loosened. When the arm 11 is extended and resting upon the floor or ground surface with the king nuts 31 tightened, proper balance is provided for the child's weight while standing and attempting to move in any direction.

As shown, the frame sections are adjustable so that the frame can be extended or contracted both longitudinally and vertically as was described previously.

STROLLER

Referring now to the drawings in FIGS. 8 through 15 in detail, the reference numeral 38 represents a stroller according to the present invention wherein there is a frame 12 which has been elevated on one end by means of caster wheels 17. The opposite end of the frame 14 is supported upon two caster wheels. Each caster wheel 17 is inserted into a hole 37 at the end of each extension arm 11.

The frame 12 supports two stop mounts 30, one on each side of the elevated end of the frame. The stop mounts 30 are secured to the frame 12 with two counter-punch snaps 32 and prevent the extension arm 11 from further rotation when the arm is locked in place by fitting it into space 39 and tightening king nuts 31.

The frame 38 also supports a seating 18 made of a polyurethane plastic material, the seating at one end being formed having three extending tabs 19 each of which are supported by means of compression coil springs 20 to the frame tubing section 14. The seating 18 consists of a bottom 18 which is the same as that used for the crawler but which is the bottom surface of the crawler seating containing two sides 40, a seat belt 41 and a backing 42.

Both sides 40 and backing 42 are sewed to the bottom 18. The seating 18 is fully assembled when each extending tab 21 is fitted between slots 43 on backing 42 and snapped into place with snap-fasteners 44 at the end of each extending tab 21. The extending tabs 19 and 21 are connected to compression coil springs 20 and 22 supported upon upward turned ends of frame sections 14 and 15. It is to be noted accordingly that the previously described seating will allow the child's weight to be supported when he is sitting resting upon his bottom and back. Also a seat belt 41 is provided to secure the child in place.

Two handles 45 are provided to allow the child to be moved from one location to another. The handles 45 are connected to the frame 15 at the elevated end. The end of each handle 45 contains an adjustable vise-grip type connection 46 which enables the handles to be easily attached or removed.

As previously, the frame sections are adjustable so that the frame can be extended or contracted both longitudinally and vertically.

BASSINET

Referring now to the drawings in FIG. 16,17,18,19,20 and 21 in detail at this time, the reference numeral 47 represents a bassinet according to the present invention wherein there is a frame support upon a plurality of four caster wheels as was described previously.

The frame supports a bedding 48 made of a polyurethane plastic material, the bedding at one end being formed having five tabs 57 each of which are supported by means of compression coil spings connected to the frame tubing sections. The opposite end of the bedding has four tabs 58, two of which are connected to compression coil springs supported upon upwardly turned ends of frame sections and two connected to adjacent sections. It is to be noted accordingly that both sides 52 and ends 53 of the bedding 48 contain a thin padding and hard cardboard backing. The bottom 49 of the bedding 48 contains an open space 50 which has a zipper 51 sewed completely around the borders which allows the crawler or stroller cushion to be zipped securely in place. Likewise the bottom 49 contains sufficient padding and a hard cardboard backing as the sides 52 and ends 53.

Both sides and ends of the bedding are securely fitted together using large snap-fasteners 56. Sixteen large snap-fasteners 56 are used to join both sides 52 to both ends 53 of the bedding. A total of sixteen snap-fasteners are used to assemble the bedding 48 together. In operative use it is apparent that the bedding supported by the frame, using both extension arms as desired for stability, forms a bassinet 47 upon which the infant is placed resting upon his abdomen or back.

As shown previously, the frame sections are adjustable so that the frame can be extended or contracted both longitudinally and vertically.

In operative use the auto-bassinet is the same as the regular bassinet which can be adjusted both longitudinally and vertically to be fitted securely between the front and back seat of an automobile. Likewise, the auto-bassinet may be fitted between both seats in an automobile by adjusting the front seat to move upwards or backwardsas desired. It is to be noted accordingly that the infant is placed lying on his abdomen or back when the bassinet is in operative use.

The storage bag 48 is the same as the crib bedding 48 when the bedding is removed from the frame. Operation of the storage bag was described in the previous description of the crib bedding. The only difference is that a top cover 54 is provided to close the bag using a strap 56 and snap fastener, also two straps 55 are provided to carry the bag on the shoulder, in the hand, or to allow the bag 48 to hang on a door.

In use it is apparent that clean folded diapers, infant clothes or other small items will be stored in the storage bag for convenience in handling.

While various changes may be made in the detail construction, it is understood that such changes will be within the spirit and scope of the present invention as is defined by the appended claims.

What I claim is:

1. The combination of a walker vehicle of a size intended for supporting a baby's movement in any direction while standing, and wheel means for support thereof in order to move about, comprising a frame formed of a plurality of tubular members that are telescopically, adjustably interconnected; said frame including parallel, longitudinally extending side frame sections having front and rear upstanding end portions; laterally, inwardly extending front frame sections detachably secured to said front upstanding portions; a rear frame section detachably secured to and extending between said rear upstanding portions; a platform detachably secured to said front and rear frame sections; extension arms pivotally mounted on said side frames adjacent said front upstanding portions for movement between a position extending along said side frames to a position extending forwardly of said frame to provide added stability thereto; and said wheel means comprising a pair of caster wheels depending from each said side frame adjacent the front and rear upright portions.

2. The invention of claim 1; wherein said platform structure forms a seat; stop mount attachments mounted on said side frame sections adjacent said front upstanding frame portions; said stop mount attachments having spaces for receiving and holding said extensions in a position substantially perpendicular to said side frames; said extensions having means on their free ends for detachably receiving caster wheels; and detachable handles secured to said front frame sections.

3. The invention as claimed in claim 1; wherein said platform forms a bedding including a bottom section having side and end sections secured thereto; snap fasteners for securing said side and end sections together; said bottom section having a space for receiving a detachably secured enclosure; a top cover secured to one of said side sections; and side sections.

* * * * *